April 2, 1935.  L. S. CHADWICK  1,996,405
SHAVING EQUIPMENT
Filed March 27, 1933  3 Sheets-Sheet 1
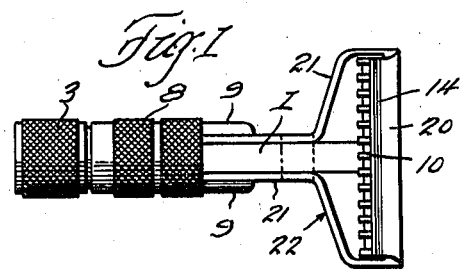
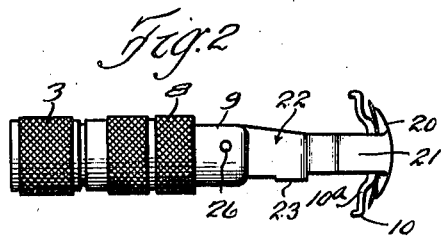
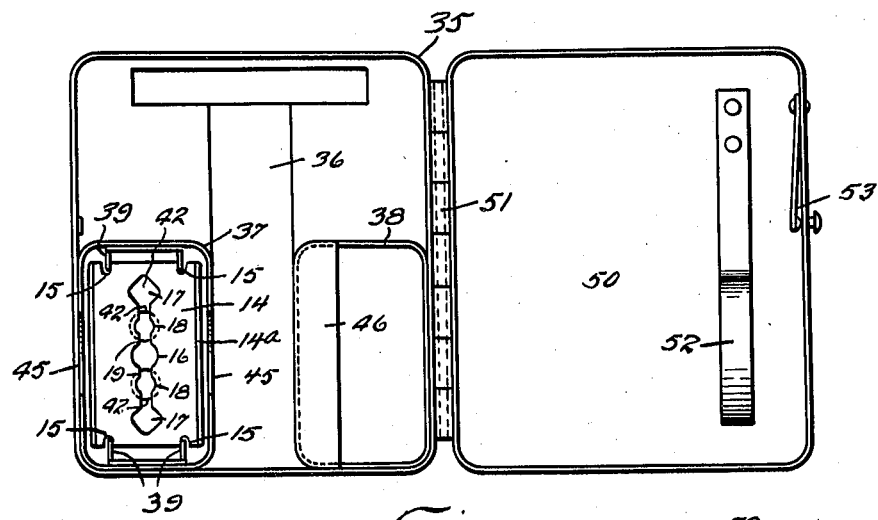
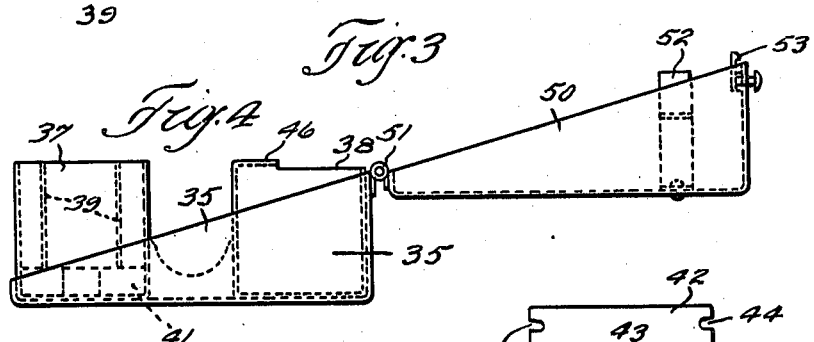
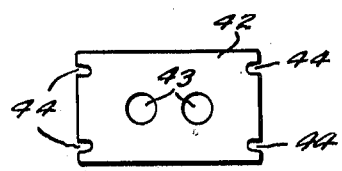

April 2, 1935.  L. S. CHADWICK  1,996,405
SHAVING EQUIPMENT
Filed March 27, 1933   3 Sheets-Sheet 2
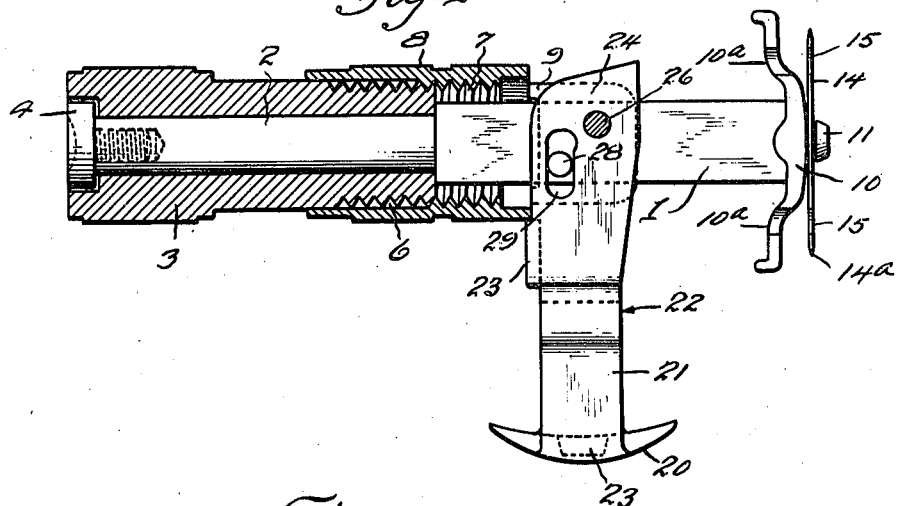
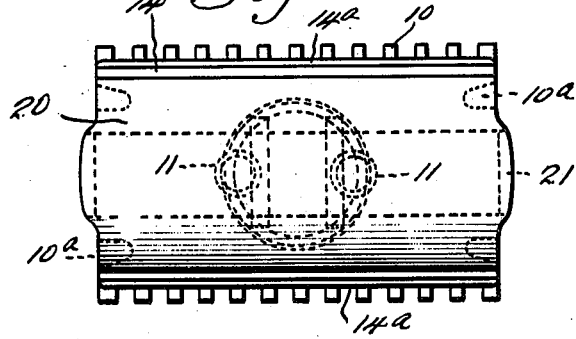
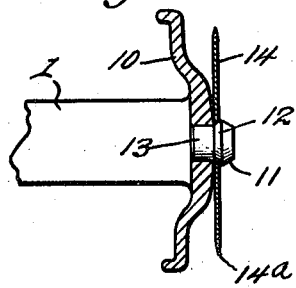
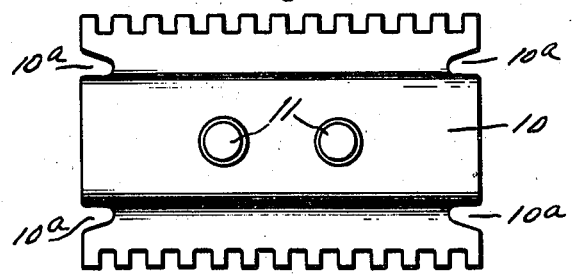

April 2, 1935. L. S. CHADWICK 1,996,405
SHAVING EQUIPMENT
Filed March 27, 1933 3 Sheets-Sheet 3
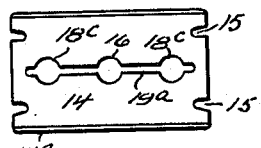
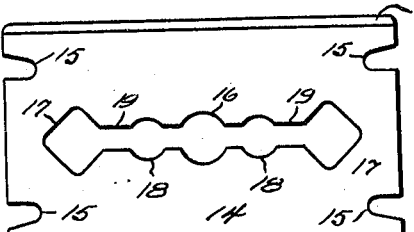
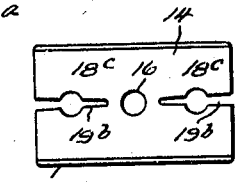
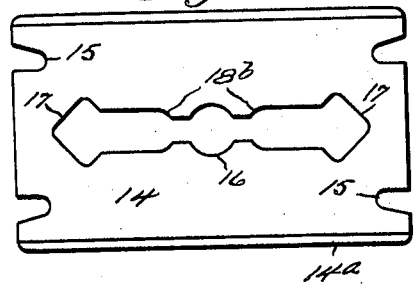
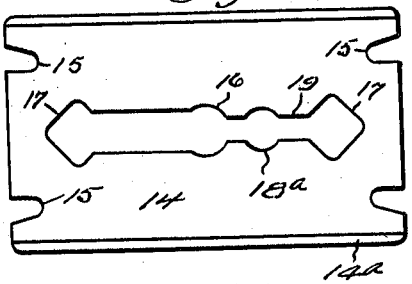
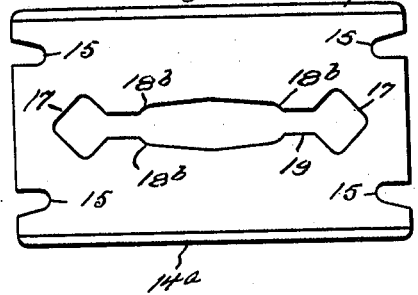
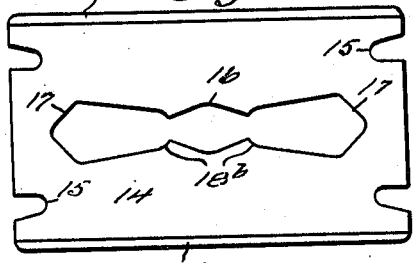
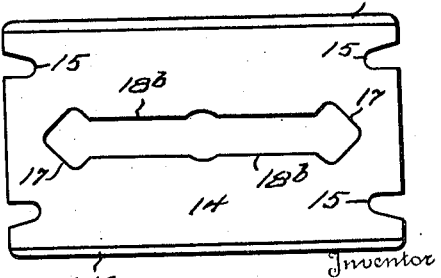
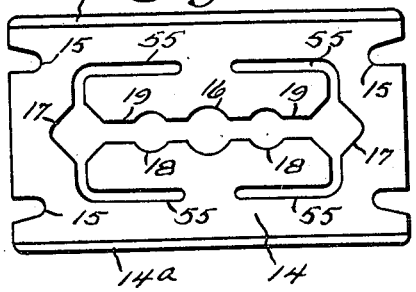

Patented Apr. 2, 1935

1,996,405

UNITED STATES PATENT OFFICE 1,996,405

SHAVING EQUIPMENT

Lee S. Chadwick, Shaker Heights, Ohio

Application March 27, 1933, Serial No. 662,963

2 Claims. (Cl. 30—12)

This invention pertains to improved shaving equipment, similar to that constituting the subject matter of my former Letters Patent No. 1,867,905, dated July 19, 1932. Such equipment, in its entirety, consists of a safety razor, a plurality of blades therefor, a holder for fresh blades, and a receiver for used blades, the holder and receiver being preferably incorporated in a case in which the razor may be kept when not in use.

The present razor, like that shown in my earlier patent, comprises a body portion including a handle at one end and a guard at the other, a face plate that is movably but non-detachably connected to the body portion, and mechanism associated with the handle for moving the face plate toward and from the guard and between a position in confronting relation thereto and a second position to one side and to the rear thereof. When the face plate is in the latter position, the guard is fully exposed for the application of a blade thereto or its removal therefrom.

The guard is provided with means for automatically attaching a blade to it when, exposed as aforesaid and by an appropriate manipulation of the razor, the guard is presented in proper relation to a blade in the holder. After the blade is thus attached, the mechanism associated with the handle may be actuated to return the face plate to normal blade holding or clamping position thereby to place the razor in readiness for use. After shaving the razor may be cleaned simply by operating the aforesaid mechanism to more or less expose the blade and then subjecting the parts to the action of rinsing water. When a blade has been dulled to such an extent as to make further use of it undesirable, it may be discharged into the receiver by engaging it, when fully exposed, with a stripper that is associated with the receiver.

It will be seen from the foregoing that in the use of both my present and former inventions, it is unnecessary at any time to touch the blade with the fingers; and that the razor has no disconnected parts that have to be separately handled with the liability of dropping and damaging them.

It will also be apparent that the success of such an outfit depends upon the infallibility of the means for initially attaching the blade to the part of the razor by which it is carried, prior to clamping it between the face plate and guard.

In the present invention, as herein illustrated, such means consist of cooperating parts including buttons or protuberances on the guard of the razor, and portions of the blade that are arranged to snap thereover or have interlocking or frictional engagement therewith. In order to insure satisfactory performance of the equipment, therefore, a relatively high degree of precision should be observed in making the cooperating parts of the razor and blade, and, also, means should be provided for accurately guiding the razor in proper relation to the blade in the attaching of the latter to the former.

Among the objects of my present invention are the provision of a razor of the above described character in which the cooperating parts for attaching the blade to the razor are certain of action and therefore dependable; wherein such parts serve the two-fold purpose of attaching the blade to the razor and of holding it in proper position thereon, as in alignment with the guard and against longitudinal displacement with respect thereto; wherein a plurality of individual attaching means constitute said cooperating parts so that in case but one is effective as a holding medium, the attachment of the blade is assured, the remainder serving in such case as positioning means; to provide a construction in which blades may be employed whose cutting edges are co-extensive with their length, thus minimizing the width of the razor, and whose ends are formed with notches or recesses for cooperation with the guides associated with the holder for fresh blades, the part of the razor to which the blades are attached being similarly formed for the same purpose, thereby to insure accurate positioning of the parts in the process of attaching a blade to the razor, and to so design the blade that the flexing thereof, and any strains or stresses developed therein due to the holding parts of the blade being snapped over, interlocked or frictionally engaged with the buttons or protuberances of the razor, will be confined to limited areas of the blade, preferably stopping short of the ends thereof, thus avoiding the danger of cracking or breaking the blades.

Other objects and advantages will appear as I proceed to describe the invention by reference to the accompanying drawings wherein Figs. 1 and 2 are elevational views, taken at right angles to each other, of the razor; Fig. 3 is a plan view of a case with the lid open in which the razor may be kept when not in use and incorporating a holder for fresh blades and a receiver for used blades; Fig. 4 is a side elevation of the case; Fig. 5 is a front elevation of the case with the lid closed; Fig. 6 is a view of one of the separators between adjacent ones of a plurality of which the fresh blades are packed in the holder; Fig. 7 is a sectional side elevation of the razor with the face plate swung to one side and to the rear so as to expose the blade, this and the succeeding views (excepting Figs. 18 and 19) being on a scale considerably enlarged over that of the preceding views; Fig. 8 is an elevation of the face plate end of the razor; Fig. 9 is an elevational view of the guard; Fig. 10 is a transverse sectional detail of the guard and a blade attached thereto; Figs. 11 to 17 show blades having slots of various shapes but all of which are adapted for use with the razor as herein illustrated, and Figs. 18 and 19 show blades in which the holes are spaced in accordance with the stem and guide pin arrangement of the original type of Gillette razor, the use of these blades requiring a somewhat further spacing apart and a slight enlarging of the buttons or protuberances of my razor.

The razor includes a post 1 that is rectangular in cross section and on a cylindrical extension 2 of which (Fig. 7) is rotatably mounted a handle 3. A screw 4, whose head occupies a recess in the outer end of the handle, is threaded into the end of said cylindrical portion and serves to hold the handle thereon. The inner end of the handle is externally threaded at 6 for cooperation with the internally threaded portion 7 of a surrounding sleeve 8, and extending from the end of said sleeve remote from the handle are opposed cheeks 9 that are spaced from the opposite sides of the post 1.

On the end of the post 1 opposite that on which the handle 3 is mounted, is a guard 10 whose outer surface is generally convexed, and projecting from the face of said guard are blade attaching buttons or protuberances 11. As herein illustrated, the outer ends of the buttons or protuberances 11 are tapered at an angle of approximately 25° from their longitudinal axes, and are slightly undercut at 12 (Fig. 10) for a purpose which will presently appear. Each button or protuberance is formed with a shank that is pressed or driven into a hole in the guard 10, as illustrated in Fig. 10, where the shank is designated 13.

Blades having openings or slots of different shapes are adapted for use with the razor as herein illustrated, but for the present I shall confine my description to the style of blade shown reposing in the holder for fresh blades in Fig. 3, and illustrated on an enlarged scale in Fig. 11. The blade, designated 14, is rectangular in shape and its cutting edges 14ª extend its full length. Laterally spaced notches 15 are formed in each end of the blade for a purpose that will presently appear. The blade has a circular opening 16 at its center and angular openings 17 near its ends, with apertures 18 of lesser diameter between them, all being in longitudinal alignment and connected by a slot 19. The apertures 18 are intended to receive the buttons 11 of the razor, while those designated 16 and 17 adapt the blade for use with the original type of Gillette razor by being so located as to accommodate, respectively, the central threaded stem and the positioning or guide pins thereof.

The diameter of the apertures 18 is very slightly less than the diameter of the largest portion of the buttons 11 adjacent the undercut portions 12 thereof. The blade is detachably connected to the razor by forcing the buttons 11 through the apertures 18, the tongues between the central and end openings on opposite sides of the slot 19 yielding to the passage of the buttons through said apertures, while the resiliency of the blade will cause it to contract about the undercut portions 12 and thus secure the blade to the buttons in contact with the adjacent portion of the guard.

It is readily apparent that the two buttons or protuberances 11 serve not only as means for attaching the blade to the razor but as means for maintaining it in position thereon. The blade is prevented from either turning or shifting lengthwise by the engagement of the buttons or protuberances through the apertures 18. If for any reason one of the buttons or protuberances fails to function as a holding means, the blade will still be attached by the other and held in position by both.

It is further to be observed that the flexing of the blade incident to its application to the buttons or protuberances 11 will be confined to the aforesaid tongues on opposite sides of the slot 19 and between the central opening 16 and the end openings 17, confining any strains or stresses to the region of said tongues and which might tend to break or crack the blade if permitted to reach the end portions thereof. For this reason, it is desirable that the openings which form the terminals of the slot 19 be relatively large so as to effect tongue-like portions between them on opposite sides of the slot. Considering the size of the openings 16 and 17, I find a diameter of approximately $\frac{3}{32}$ of an inch especially suitable for the apertures 18 and a diameter very slightly greater for the blade engaging portions of the buttons or protuberances 11. Also, $\frac{7}{16}$ of an inch between centers is a satisfactory spacing of said apertures 18.

A concavo-convexed face plate 20 is carried by the outer ends of arms 21 that form the opposed branches of a yoke-like structure designated generally by the reference numeral 22. The inner ends of the arms 21 are extended inwardly and thence in parallel relation to each other in a direction away from the face plate on opposite sides of the post 1 and between it and the cheeks 9 of sleeve 8, and they are slightly enlarged in a transverse direction and are preferably, though not necessarily, connected together by a cross member 23. The enlarged inner ends of the arms are designated 24 and they are provided with bearing apertures that are occupied by pivot members 26 whose outer ends fit within holes in the cheeks 9. Thus it will be seen that the yoke-like structure 22 is pivoted to the sleeve 8 so that it may swing between the positions that are illustrated, respectively, in Figs. 2 and 7. The structure 22 is also pivotally connected, as well as slidably connected, to the post 1 by means of a pin 28 that is extended through a transverse bore of the post and whose ends occupy slots 29 in the enlarged ends 24 of the arms 21, the slots being properly shaped to allow for the desired movement of the yoke-like structure 22, as will clearly appear from a later description of the operation of the razor. The inner surface of the face plate 20 is provided with an appropriately shaped recess or recesses for the accommodation of the buttons or protuberances 11, such being shown in dotted lines and designated 30 in Fig. 7.

The case 35, shown in Figs. 3, 4 and 5, contains a compartment 36 for the razor, a holder 37 for fresh blades and a receiver 38 for used blades. The holder 37 is a box-like receptacle by the end walls of which are carried rail-like guides 39 which may consist of flanges of inwardly facing channels and wherewith the notches 15 of the blades cooperate when the blades repose within the holder. The ends of the guard 10 of the razor are notched at 10ª for similar co-operation with the guides 39. The blades are adapted to be stacked within said holder upon a suitable base 41, with separators 42 between adjacent ones thereof. These separators are preferably made of relatively thick waxed paper and one of them is shown in detail in Fig. 6. Each separator has holes 43 in its body portion and guide receiving notches 44 in its ends, the openings of the several separators registering with the apertures 18 of the blades, as clearly indicated in Fig. 3. The sides of the holder 37 are cut away at 45 to facilitate placement of a stack of blades and separators within the holder. A stripper plate 46 extends part way over and along one side of the receiver 38. A lid 50 is connected by a hinge 51 to one side of the case, and to the inner side of its top is riveted or otherwise secured a spring 52 which is arranged to engage the stack of blades and separators when the lid is closed to prevent their being jostled about and disarranged in the handling of the case. A latch 53 of any approved form is provided for releasably holding the cover closed.

Figs. 1 and 2 show the razor conditioned for use with the blade clamped between the face plate and the guard, the blade, in the present instance, being transversely curved to correspond with the concaved inner surface of the face plate. This curvature may be changed by relaxing the face plate slightly through a proper manipulation of the handle 3 to dispose the cutting edges of the blade somewhat further away from the guard.

When it is desired to clean the razor, as after a shaving operation, it is only necessary to turn the handle 3 in a direction to feed the sleeve 8 forwardly along the post 1 which will impart like movement to the yoke-like structure 22, such forward movement continuing until the inner ends of the slots 29 engage the pin 28, under which condition the face plate 20 is spaced a material distance away from the blade 14 while yet in confronting relation to the guard 10, thus allowing the blade to relax to its normal flat condition in which condition it engages but a very small part of the outer surface of the guard 10. With the parts in this condition, the razor may be rinsed thoroughly and the water shaken from the blade and the adjacent parts of the razor. Unless the blade is to be changed, the handle may be turned to feed the sleeve inwardly and retract the face plate and again clamp the blade between the latter and the guard; and in this condition the razor may be placed within the case 35 in readiness for a subsequent shaving operation.

When it is desired to discard a used blade and apply a fresh one to the razor, the handle 3 is turned to first project the face plate, as above described, and then, by continued turning, to extend the sleeve 8 forwardly a greater distance than before along the post 1 so as to carry the pivot members 26 forwardly beyond the pin 28, thereby to cause the yoke-like structure 22 to swing about said pin to the position shown in Fig. 7. With the parts in this condition, the blade 14 is completely exposed and relaxed so that one edge of the blade may be inserted beneath the stripper plate 46, that partially covers the receiver 38, while the guard is moved across the upper surface thereof. When the blade is in a position to be dropped within the receiver, the razor may be lifted to strip the blade from the buttons or protuberances 11 and said blade, thus disconnected from the razor, will drop within the receiver. The razor is then applied to the top blade of the pack in the holder 37 and the buttons or protuberances 11 are forced through the apertures 18 thereof. The resiliency of the tongue portions of the blade, as hereinbefore explained, will cause the blade to connect itself with a snap action to the buttons or protuberances 11. Now by turning the handle 3 in a direction to feed the sleeve 8 rearwardly along the post 1, the yoke-like structure 22 is caused to swing into alignment with the post with the face plate 20 in confronting relation to the guard 10, and continued rotation of the handle in the same direction will draw the parts together to clamp the blade between the face plate and guard, as shown in Fig. 2.

Thus it will be seen that my present invention, like its predecessor hereinbefore referred to, provides shaving equipment that makes it unecessary to touch the blades in applying them to or removing them from the razor, and that it is not necessary to remove any part from the razor for the purpose of thoroughly rinsing it.

Figs. 12 to 17 show modifications of the blade that are adapted for use with the razor as herein illustrated. In each case, flexible tongues or portions are provided on opposite sides of the slot between the enlarged openings that form the terminals thereof. Spaced longitudinally of each slot, according to the spacing apart of the buttons or protuberances of the razor, are parts that cooperate with the buttons or protuberances for attaching the blade to the razor and maintaining it in proper position thereon. In all of the modifications under consideration, excepting that shown in Fig. 13, the blade possesses parts that cooperate with both buttons or protuberances in the same manner as the apertures of the blade shown in Fig. 11 cooperate with such parts, but in the blade illustrated in Fig. 13, only one aperture, designated 18ª, is intended for interlocking engagement with one of the buttons or protuberances, the other simply being engaged through the widened portion of the slot for preventing lateral displacement of the blade. The parts of the various blades illustrated in Figs. 12, 14, 15, 16 and 17, that are designed for holding engagement with the buttons or protuberances of the razor, are designated 18ᵇ, and it will be observed that in the blades shown in Figs. 12 and 15, such parts 18ᵇ engage the inner sides of the buttons or protuberances for holding the blade to the guard and against either lateral or longitudinal displacement thereof, while the parts 18ᵇ of the blade shown in Fig. 14 engage the outer sides of said buttons or protuberances in the attainment of the above mentioned results. In the case of Fig. 16, the parts 18ᵇ grasp the protuberances with sufficient friction to initially hold the blade against endwise as well as sidewise accidental displacement. The blade shown in Fig. 17 is like that illustrated in Fig. 11 excepting for the fact that the blade is rendered more flexible throughout its entire area by the branch slots 55 that extend laterally from the end openings 17 and thence inwardly in parallelism with the cutting edges 14ª of the blade. In the present modification, the tongues on the opposite sides of the slot 19 are much more flexible than in the previously described modifications and this further promotes that object of the invention which is to avoid strains or stresses occasioned by the insertion of the buttons or protuberances through the apertures 18 from being communicated to the end portions of the blade, and it has the further advantage of lessening the tendency to withdraw the blade from the buttons or protuberances of the razor by the transverse curving of the blade due to the clamping of the same between the face plate 20 and the guard 10, as in Fig. 2. In other words, it makes the action of the central portion of the blade on the opposite sides of the slot 19 more independent of the action of the marginal portions of the blade. Notwithstanding the difference in shape between the openings of the various blades so far considered, all of said blades are applicable to the original type of Gillette razor.

While the blades illustrated in Figs. 18 and 19 are also designed for use with the original type of Gillette razor, they require a change in the size and spacing of the buttons or protuberances of my razor to correspond approximately to the size and spacing of the locating pins of said Gillette razor. In these cases, the buttons or protuberances are adapted to be projected through the apertures 18c for interlocking or holding engagement with the blade, said apertures and the central opening 16, in the blade of Fig. 18, being joined by the slot 19a. The apertures 18c and opening 16 in the blade illustrated in Fig. 19 bear the same relation to one another as they do in the blade of Fig. 18, but slots 19b extend inwardly from opposite ends of the blade through the apertures 18c and rather closely approach but do not join the central opening 16. The outer ends of these slots 19b are intended to cooperate with single guides disposed at opposite ends of the holder 37. Such a modification of the holder and the change in the razor necessary to adapt it for use with the blades of Figs. 18 and 19 are so obvious that specific illustration is deemed unnecessary. Of course it is clear that if single guides were employed at the opposite ends of the holder for cooperation with the slots 19b of the blade shown in Fig. 19, the guard of the razor would be similarly modified to have but one notch at each end.

Having thus described my invention, what I claim is:

1. In combination, a razor body having spaced non-yielding undercut protuberances, and a blade having a central opening and openings adjacent its opposite ends all of which are connected together by a relatively narrow slot so as to effect upon opposite sides of said slots tongues between which the protuberances of the razor body are adapted to be projected, said tongues yielding to a forcible projection of the protuberances between them and contracting about said protuberances in such manner as to connect the blade to the razor body and hold it in position thereon, the blade having cutting edges coextensive with its length and notches in its ends for cooperation with guides of a blade holder.

2. In combination, a razor body including a part to which a blade is adapted to be attached, a pair of rigid button-like protuberances extending from the face of said part, a second part movably connected to the razor body by branches that operate in close proximity to the ends of the first mentioned part, a resilient razor blade that is the same in length as said first mentioned part and whose cutting edges are co-extensive in length with is body portion, said blade being adapted to be clamped between said parts and being cut away throughout its central portion to provide opposed portions between which the protuberances are adapted to be engaged, said portions cooperating with the protuberances in such manner as to attach the blade to the first mentioned part and maintain it in position thereon, the ends of the blade and said first mentioned part having registering notches for cooperation with guides of a blade holder.

LEE S. CHADWICK.